US012644387B1

(12) United States Patent
Lefebvre et al.

(10) Patent No.: US 12,644,387 B1
(45) Date of Patent: Jun. 2, 2026

(54) TURBINE VANE ASSEMBLY FOR CONTROLLING TIP CLEARANCE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA); Rabih Kamal Kassab, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/185,530

(22) Filed: Apr. 22, 2025

(51) Int. Cl.
*F01D 9/04* (2006.01)
*F01D 11/08* (2006.01)
*F01D 25/16* (2006.01)
*F01D 25/24* (2006.01)
*F01D 25/28* (2006.01)

(52) U.S. Cl.
CPC ........... *F01D 9/041* (2013.01); *F01D 25/162* (2013.01); *F01D 25/243* (2013.01); *F01D 25/246* (2013.01); *F01D 25/28* (2013.01); *F01D 9/042* (2013.01); *F01D 11/08* (2013.01); *F05D 2230/60* (2013.01); *F05D 2230/64* (2013.01); *F05D 2240/12* (2013.01)

(58) Field of Classification Search
CPC .......... F01D 9/041; F01D 9/042; F01D 11/08; F01D 11/122; F01D 25/162; F01D 25/246; F01D 25/243; F01D 25/28; F05D 2230/64; F05D 2230/644
See application file for complete search history.

(56) References Cited

U.S. PATENT DOCUMENTS

| | | | | |
|---|---|---|---|---|
| 4,720,236 | A * | 1/1988 | Stevens | F01D 9/042 415/134 |
| 5,839,878 | A * | 11/1998 | Maier | F01D 9/042 415/209.2 |
| 6,287,091 | B1 * | 9/2001 | Svihla | F01D 25/246 415/209.1 |
| 8,888,442 | B2 * | 11/2014 | Bharath | F01D 9/041 415/138 |
| 10,370,990 | B2 | 8/2019 | Reynolds et al. | |
| 10,408,059 | B2 | 9/2019 | Vyvey | |
| 10,822,973 | B2 | 11/2020 | Parvis et al. | |
| 2019/0055856 | A1 * | 2/2019 | Bärow | F01D 25/246 |

* cited by examiner

*Primary Examiner* — Christopher Verdier
(74) *Attorney, Agent, or Firm* — NORTON ROSE FULBRIGHT CANADA LLP

(57) ABSTRACT

An aircraft engine having a turbine assembly including a bearing housing having a central axis, a first-stage vane ring and a second-stage vane ring. The first-stage vane ring is positioned in concentric relation with the bearing housing via a first circumferential array of lugs and slots between the bearing housing and the first-stage vane ring. The second-stage vane ring is positioned in concentric relation to the first-stage vane ring via a second circumferential array of lugs and slots between the first-stage vane ring and the second-stage vane ring.

15 Claims, 5 Drawing Sheets

TURBINE VANE ASSEMBLY FOR CONTROLLING TIP CLEARANCE

TECHNICAL FIELD

The disclosure relates generally to aircraft engines and, more particularly, to a turbine vane assembly.

BACKGROUND OF THE ART

The efficiency of a turbine engine is dependent upon many factors, one of which is the clearance between the rotor blade tips and the shroud surrounding the tips of the turbine blades. If the clearance is too large, an unacceptable degree of gas leakage will occur with a resultant loss in efficiency. If the clearance is too small, there is a risk that under certain conditions contact will occur between the rotating and stator components with detrimental damage possibly occurring. There is, thus, a continued need for improvements.

SUMMARY

In one aspect, there is provided a turbine assembly for an aircraft engine, comprising: a bearing housing having a central axis; a first-stage vane ring positioned in concentric relation with the bearing housing via a first circumferential array of lugs and slots between the bearing housing and the first-stage vane ring; and a second-stage vane ring positioned in concentric relation to the first-stage vane ring via a second circumferential array of lugs and slots between the first-stage vane ring and the second-stage vane ring.

In another aspect, there is provided an aircraft engine comprising: a turbine including a first-stage vane ring, a turbine rotor and a second-stage vane ring disposed in series along a central axis, the turbine rotor having a row of turbine blades surrounded by an inner surface of an outer shroud of the second-stage vane ring, the turbine blades having tips spaced from the inner surface of the outer shroud by a tip clearance gap; and a bearing supporting the turbine rotor for rotation about the central axis; wherein a first circumferential array of lugs and slots centralizes the first-stage vane ring on a bearing housing of the bearing, and wherein a second circumferential array of lugs and slots centralizes the second-stage vane ring on the first-stage vane ring.

In a further aspect, there is provided a method of centralizing an outer shroud of a second-stage vane ring about a row of turbine blades of a turbine rotor supported by a bearing for rotation about a central axis; the method comprising: concentrically mounting a first-stage vane ring to a bearing housing of the bearing supporting the turbine rotor; and then concentrically mounting the second-stage vane ring to the first-stage vane ring.

DESCRIPTION OF THE DRAWINGS

Reference is now made to the accompanying figures in which.

DETAILED DESCRIPTION

Figure 1:
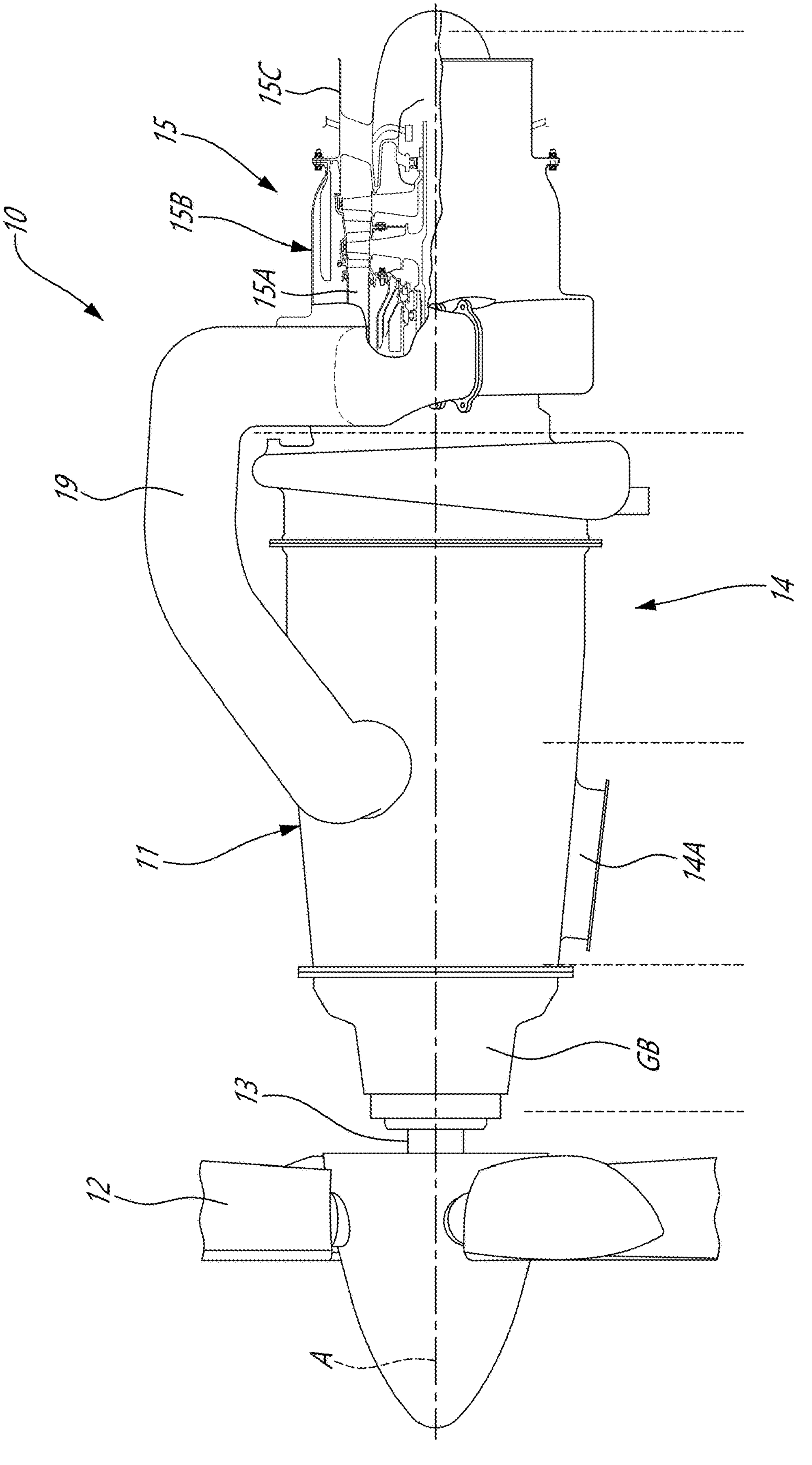
FIG. 1 is a schematic cross sectional view of an aircraft engine.

Referring to FIG. 1, an aircraft engine 10 is schematically shown. The exemplified aircraft engine 10 comprises a thermal engine module 11 including one or more internal combustion engine(s), drivingly engaged to a rotatable load 12, herein depicted as a propeller, via an output shaft 13 of a gearbox GB. The thermal engine module 11 may include any engine having at least one combustion chamber of varying volume. For instance, the thermal engine module 11 may comprise one or more piston engine(s) or one or more rotary engine(s) (e.g., Wankel engines). The aircraft engine 10 further includes a compressor 14 having an air inlet **14*a* receiving ambient air from the environment E outside the aircraft engine 10 and a compressor outlet fluidly connected to an air inlet of the thermal engine module 11**.

Figure 2:
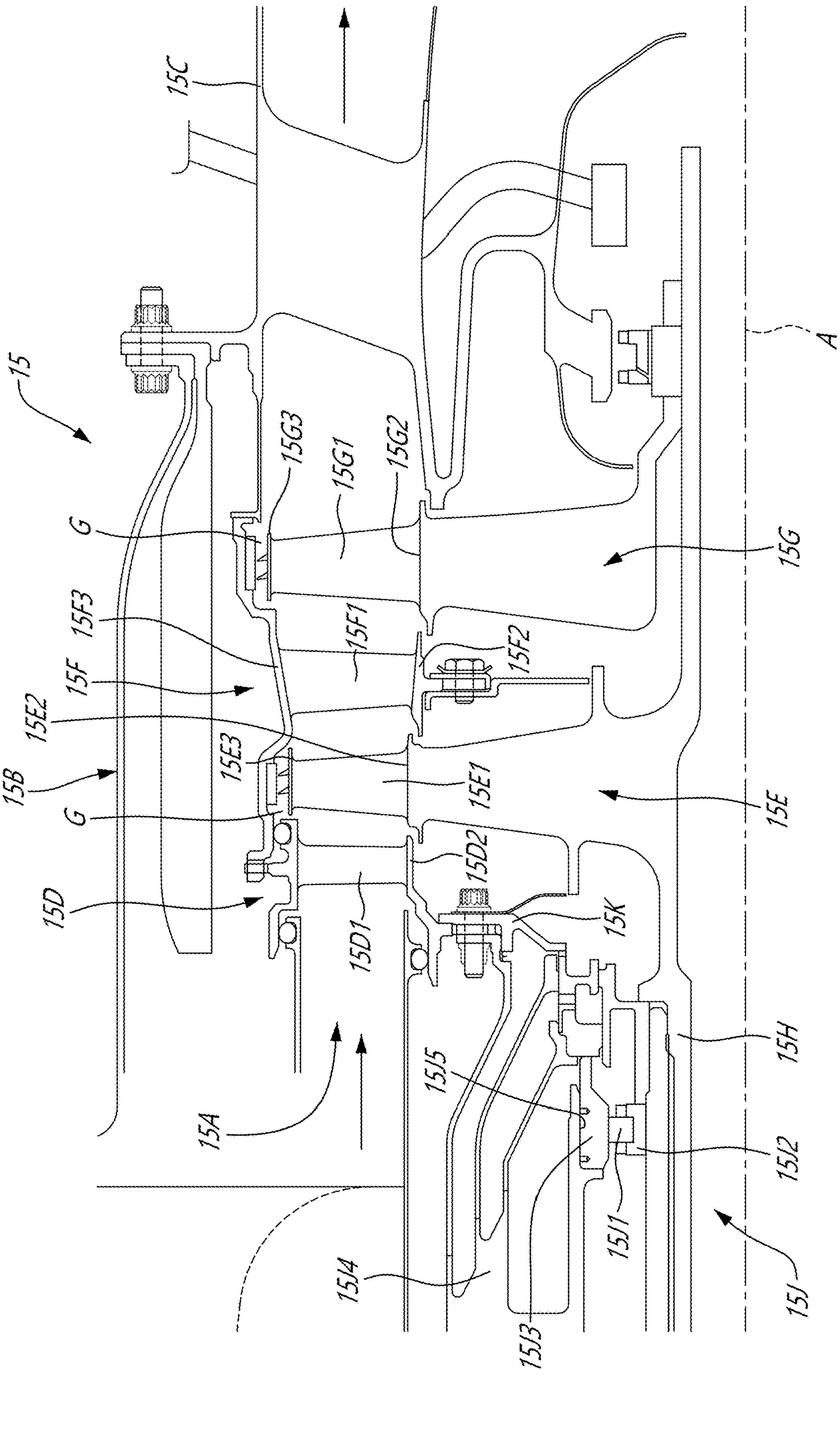
FIG. 2 is a cross-section view of a turbine section of the aircraft engine shown in FIG. 1.

Referring to FIGS. 1-2, in one or more embodiment(s), the engine 10 further includes a turbine assembly 15 (e.g., a power turbine assembly) having an axially facing turbine inlet 15A fluidly connected to an engine outlet or exhaust of the thermal engine module 11. The engine outlet of the thermal engine module 11 may be fluidly connected to an exhaust manifold that receives combustion gases outputted by the combustion chambers of the thermal engine module 11. The exhaust manifold collects the combustion gases from the different combustion chambers and flows these combustion gases to a combustion engine exhaust pipe 19 that feeds the combustion gases to the turbine assembly 15. In other words, the engine outlet of the thermal engine module 11 is fluidly connected to the turbine inlet 15A via the exhaust manifold and the combustion engine exhaust pipe 19. Any other suitable configurations used to supply combustion gases to the turbine assembly 15 are contemplated without departing from the scope of the present disclosure.

The turbine assembly 15 includes a turbine support case (TSC) 15B and a turbine exhaust case 15C via which combustion gases are expelled to the environment E. The exhaust case 15C is supported by the TSC 15B. As shown in FIG. 2, the exhaust case 15C may be mounted to the TSC 15B via a bolted flange connection. The turbine exhaust case 15C may include a tailpipe or any other suitable structures (e.g., exhaust mixer) for discharging the combustion gases from the aircraft engine 10.

Referring to FIG. 2, in one or more embodiment(s), the turbine assembly 15 includes an axial turbine having successive rows of stator(s) and rotor(s) disposed in alternation along a central axis A inside the TSC 15B. According to some embodiments, the stator(s) and rotor(s) may include a first-stage vane ring 15D, a first-stage rotor 15E, a second-stage vane ring 15F and a second-stage rotor 15G disposed in series along the central axis A. While two stages of vanes and blades are shown, it is understood that any suitable number of turbine stages may be provided.

The first-stage vane ring 15D and the second-stage vane ring 15F each include a circumferential array of vanes 15D1, 15F1 extending radially between an inner shroud 15D2, 15F2 and an outer shroud 15D3, 15F3. The inner shrouds 15D2, 15F2 and the outer shrouds 15D3, 15F3 respectively form a portion of the inner and outer flow boundary surfaces of the gas path of the turbine assembly 15.

The first-stage turbine rotor 15E and the second stage turbine rotor 15G each include a circumferential array of airfoil blades 15E1, 15G1 extending radially from a hub 15E2, 15G2 to a tip 15E3, 15G3. The rotors 15E and 15G of the turbine assembly 15 are in driving engagement with a turbine shaft 15H. The turbine shaft 15H may be drivingly engaged to the output shaft 13 via the gearbox GB to compound power with the thermal engine module 11 to drive the rotatable load 12 (e.g., the propeller). In some embodiments, the turbine shaft 15H may be drivingly engaged to a compressor shaft of the compressor 14. Thus, the turbine rotors 15E and 15G may drive both the rotatable load 12 and the compressor 14.

Figure 3:
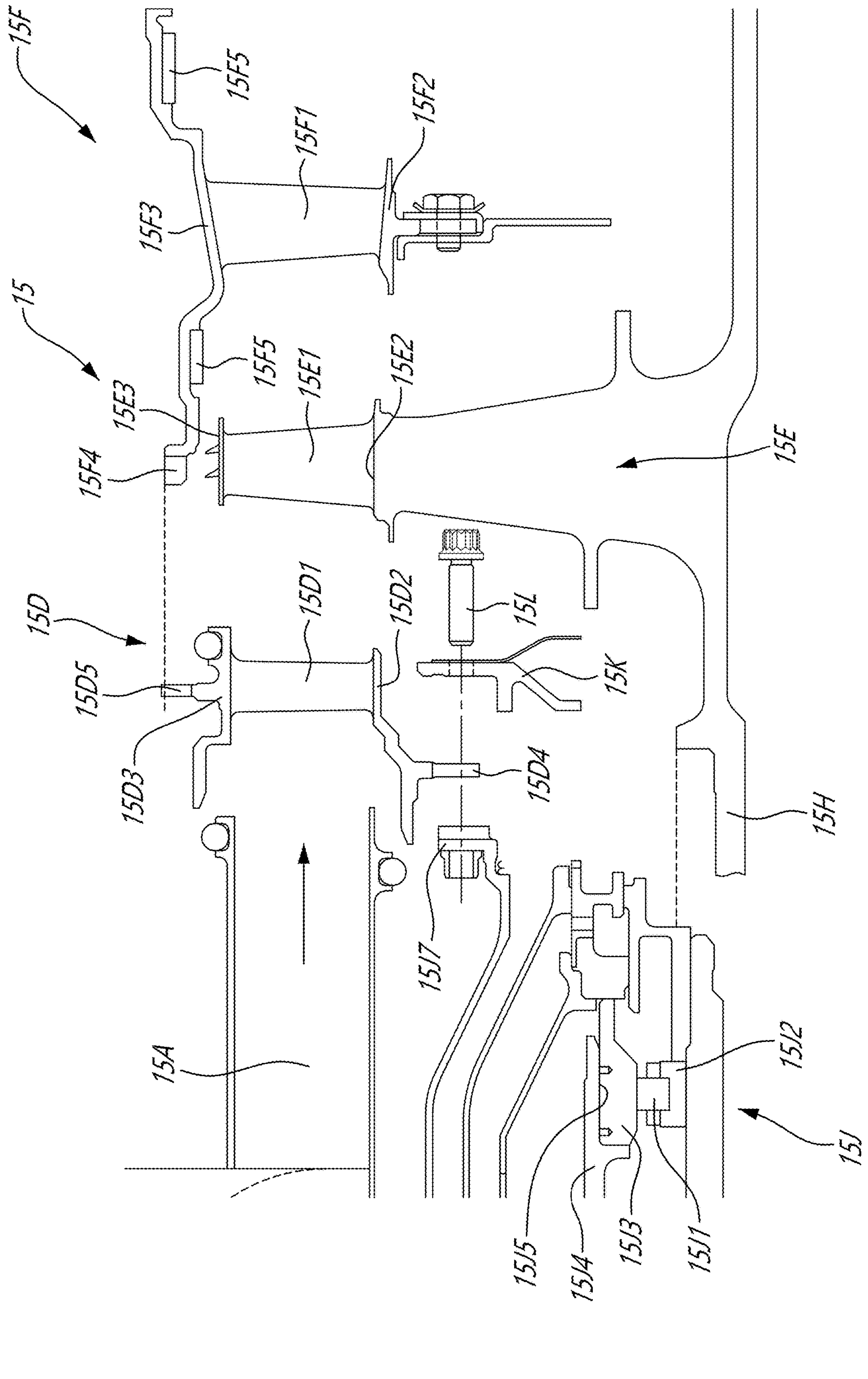
FIG. 3 is an exploded cross-section view of the turbine section shown in FIG. 2.

Bearings are provided for rotatably supporting the turbine shaft 15H and, thus, the turbine rotors along the central axis A. For instance, as shown in FIGS. 2 and 3, the bearings may include a roller bearing 15J having a plurality of rollers 15J1 disposed between an inner rail 15J2 and an outer rail 15J3. The inner rail 15J2 is mounted to an outer diameter surface of a section of the turbine shaft 15H and the outer rail 15J3 is mounted in a complementary fashion inside an axial bore or seat defined at a rear end of a bearing housing 15J4 disposed axially forward of the first-stage vane ring 15D. The roller bearing 15J centralises the shaft 15H and, thus, the turbine rotors 15E and 15G in relation to the central axis A. Indeed, the location of the central axis A corresponds to the center of the roller bearing bore interface that is the center of curvature of the bearing housing inner diameter surface 15J5 that is in tight fit engagement with the outer diameter surface of the outer rail 15J3 of the roller bearing 15J.

As can be appreciated from FIG. 2, the tips 15E3, 15G3 of the first-stage turbine blades 15E1 and the second-stage turbine blades 15G1 are spaced from a radially inwardly facing flow boundary surface of an outer shroud by a tip clearance gap G. According to some embodiments, the flow boundary surface axially spanning the tips 15E3, 15G3 of the blades 15E1 and 15G1 forms part of the outer shroud 15F3 of the second-stage vane ring 15F. That is the second-stage vane ring 15F may be used for tip clearance control. It will thus be appreciated that any relative mispositioning/eccentricity between the second-stage vane ring 15F and the turbine rotors 15E and 15G as for instance resulting from radial tolerance stack-up, may impact the tip clearance control.

One option to control the tip clearance is to mount the second-stage vane ring 15F to the TSC 15B and to rectify, such as by grinding, the inner diameter of the outer shroud 15F3 to account for tolerance accumulations, which would otherwise results in eccentricities between the turbine rotors 15E, 15G and the second-stage vane ring 15F. However, such a turbine architecture, where the static hardware (i.e., the second-stage vane ring) used for tip clearance control is positioned in relation with the TSC 15B, requires an extra machining step, which results in extra costs.

According to some embodiments, it is herein proposed to position the second-stage vane ring 15F in relation to the first-stage vane ring 15D, which is, in turn, positioned in relation to the bearing housing 15J4. In this way, both the turbine rotors 15E, 15G and the turbine vane rings 15D, 15F may be centralised in relation to the bearing housing 15J4 and its roller bearing bore interface surface 15J5 and, thus, in relation to the central axis A of the turbine rotors 15E, 15G. Such an architecture may be beneficial because both the static and rotor parts are positioned directly from the bearing housing supporting the rotor parts. Such a common referencing for the turbine rotors 15E, 15G and the static turbine vane rings 15D, 15F reduces the tolerance accumulation that would otherwise results from individually positioning the first and second stage vane rings 15D, 15F in relation to the TSC 15B. By so reducing the tolerance accumulation, the need for rectifying the inner diameter surface of the outer shroud surrounding the turbine blades may be eliminated.

Figure 4:
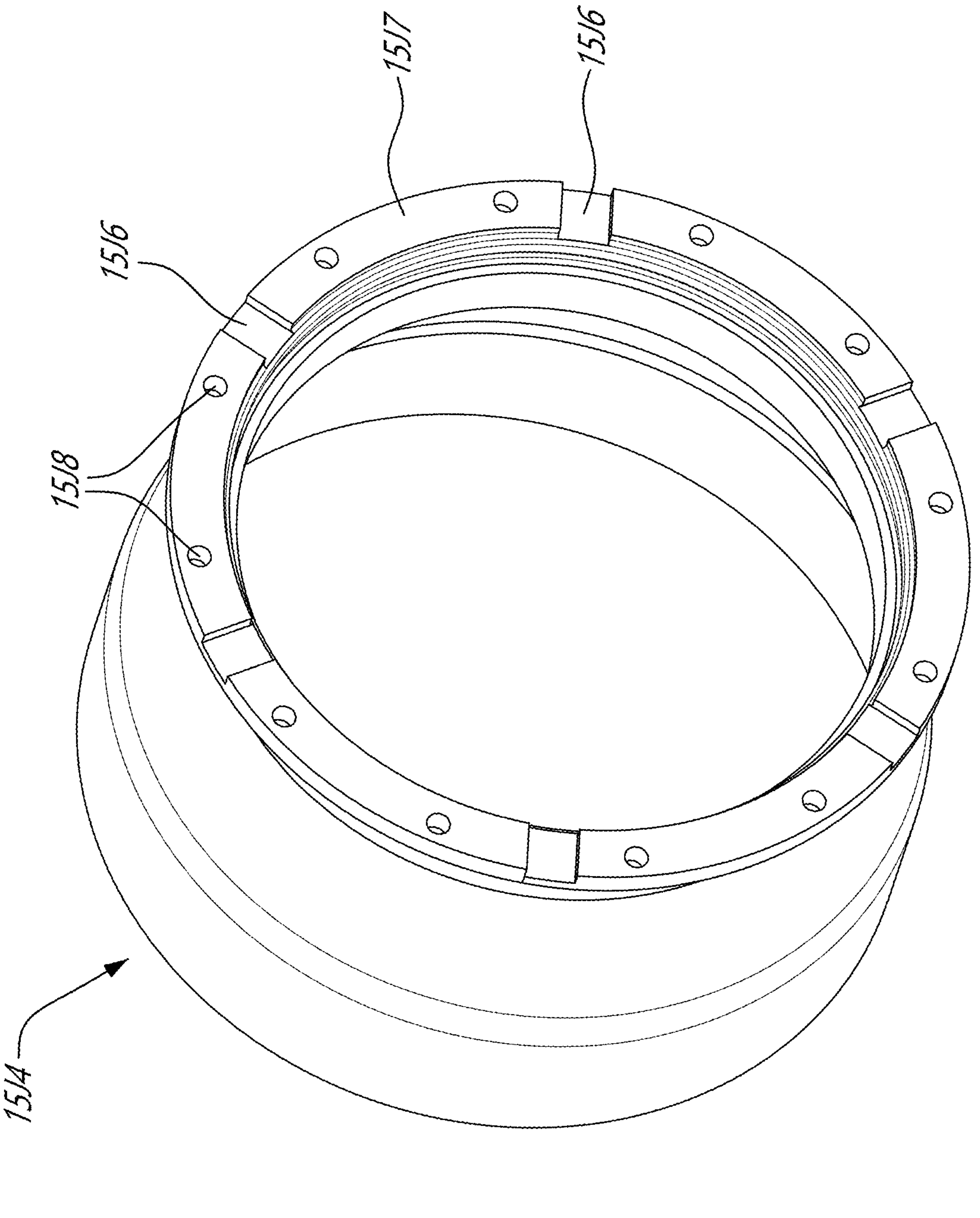
FIG. 4 is a rear perspective view of a bearing housing of the turbine section shown in FIG. 2 and illustrating a circumferential array of slots for cooperating with corresponding lugs provided on a first-stage vane ring.
Figure 5:
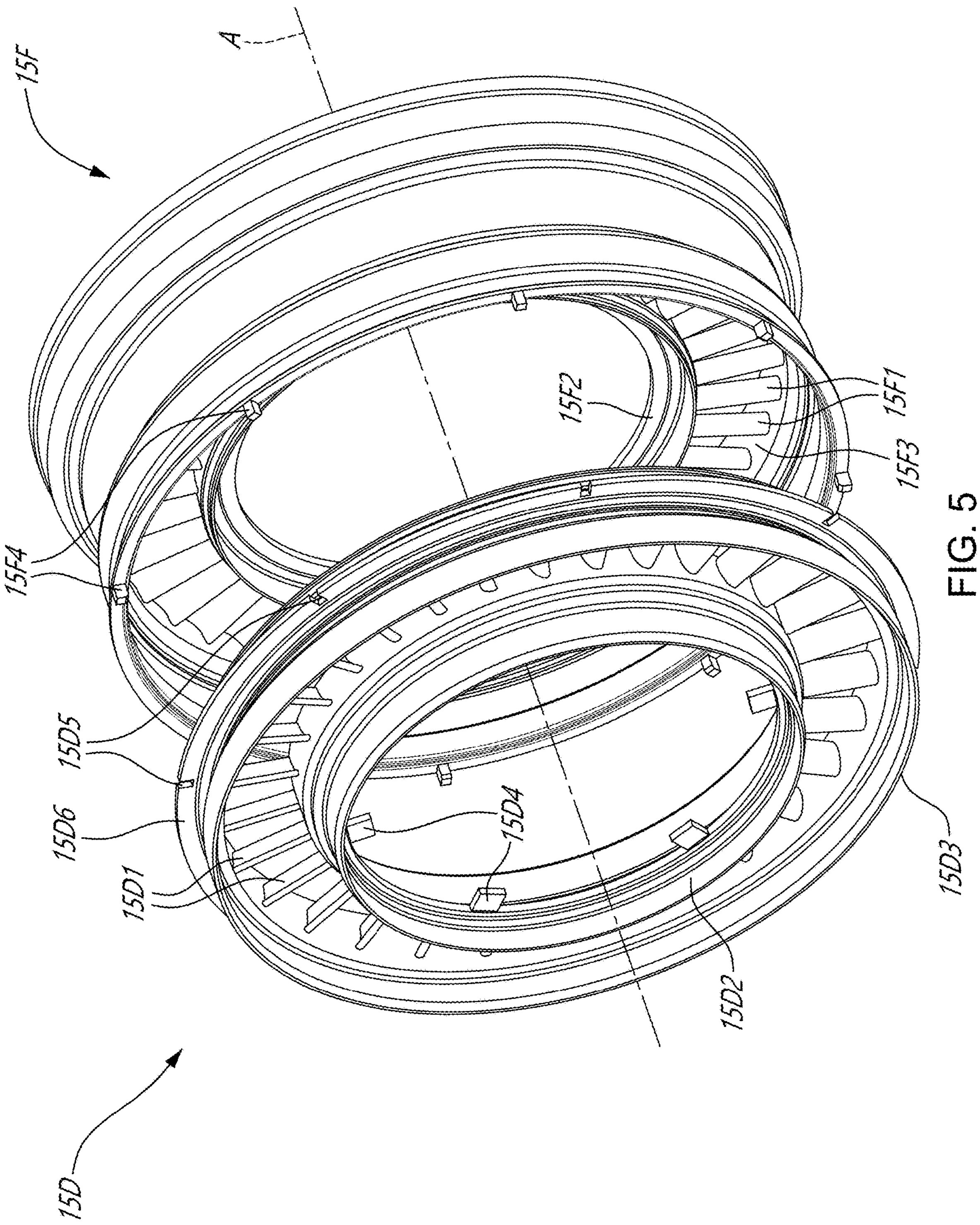
FIG. 5 is a front perspective view of the first-stage vane ring and a second-stage vane ring of the turbine section and illustrating a circumferential array of lugs and slots to centralize the second-stage vane ring relative to the first-stage vane ring.

According to some embodiments, the first-stage vane ring 15D is disposed in concentric relation with the bearing housing 15J4 via a first circumferential array of slots and lugs. Referring jointly to FIGS. 3 and 4, it can be appreciated that the first circumferential array of slots and lugs may comprise a first plurality of radial slots 15J6 circumferentially distributed in an outer annular flange 15J7 projecting radially outwardly from a rear end of the bearing housing 15J4. The circumferential array of slots 15J6 in the annular flange 15J7 of the bearing housing 15J4 is disposed in concentric relation with the bearing housing inner diameter surface 15J5. The first circumferential array of slots and lugs further comprises a first plurality of lugs 15D4 circumferentially distributed on the first-stage vane ring 15D. According to some embodiments and as shown in FIGS. 3 and 5, the lugs 15D4 are provided as radial lugs projecting radially inwardly from an inner diameter of the first-stage vane ring 15D. The lugs 15D4 on the first-stage vane ring 15D have a shape complementary to that of the slots 15J6 in the bearing housing 15J4 and are "clocked" for alignment/registry with the slots 15J6. According to the illustrated embodiment, the first circumferential array of slots and lugs comprises six slots 15J6 for mating engagement with a corresponding number of lugs 15D4. However, it is understood that more or less than six pairs of slot and lugs could be provided. For instance, 4 pairs of slots and lugs could be used to centralize the first-stage vane ring 15D on the bearing housing 15J4. The first-stage vane ring 15D is assembled onto the bearing housing 15J4 by angularly aligning the lugs 15D4 and the slots 15J6 and by then axially engaging the first-stage vane ring 15D with the bearing housing 15J4. As shown in FIGS. 2 and 3, the first-stage vane ring 15D is then axially clamped between the rear end of the bearing housing 15J4 and a back annular cover 15K via a plurality of mechanical fasteners 15L, such as bolts, engageable with corresponding holes 15J8 circumferentially interspersed between the slots 15J6 in the annular flange 15J7 of the bearing housing 15J4. In operation, such a mounting arrangement allows for the thermal growth of the first-stage vane ring 15D while ensuring that the first-stage vane ring 15D remains coaxial to the bearing housing 15J4. With this assembly concept, the tolerance between the first-stage vane ring 15D and the roller bearing outer race 15J3 is negligible. It is noted that according to some embodiments, the slots could be formed on the first-turbine vane ring 15D and the lugs on the bearing housing 15J4.

According to some embodiments, the second-stage vane ring 15F is disposed in concentric relation with the first-stage vane ring 15D via a second circumferential array of slots and lugs. Referring jointly to FIGS. 3 and 5, it can be appreciated that the second circumferential array of slots and lugs may comprise a second plurality of radial slots 15D5 circumferentially distributed in an outer annular flange 15D6 projecting radially outwardly from an outer diameter surface of the outer shroud 15D3 of the first-stage vane ring 15D. The circumferential array of slots 15D5 in the annular flange 15D6 of the first-stage vane ring 15D is disposed in concentric relation with the first circumferential array of lugs 15D4. The second circumferential array of slots and lugs further comprises a second plurality of lugs 15F4 circumferentially distributed on the front end of the second-stage vane ring 15F. As shown in FIGS. 3 and 5, the lugs of the second plurality of lugs 15F4 project axially forwardly from an outer diameter of the second-stage vane ring 15 for mating engagement with the slots 15D5 on the first-stage vane ring 15D. Like the first circumferential array of slots and lugs, the second circumferential array of slots and lugs may comprise various number of pairs of slots and lugs, such as 4 or more to properly centralise the second-stage vane ring 15F relative to the first-stage vane ring 15D. It is also noted that the lugs could be provided on the first-stage vane ring and the slots on the second-stage vane ring.

According to the above described example, the second-stage vane ring 15F is mounted to the first-stage vane ring 15D by angularly aligning the lugs 15F4 with the slots 15D5 and by then axially engaging the lugs 15F4 with the slots 15D5. Then, the second-stage vane ring 15F can be axially clamped between the turbine exhaust case 15C and the first-stage vane ring 15D, as shown in FIG. 2. In operation, this arrangement allows the thermal growth of the second-stage turbine vane ring 15F while providing for the proper centralization thereof with respect to the central axis A.

As shown in FIGS. 2 and 3, a layer of abradable material 15F5 can be provided on the flow boundary surface of the outer shroud 15F3 of the second stage-vane ring 15F around the first and second rows of turbine blades 15E1, 15G1.

From the foregoing, it can be appreciated that at least some embodiments provide for the positioning of turbine shrouds in such a way as to reduce the dimensional chain between the turbine bearings and the shrouds to effectively control the blade tip clearance.

Still according to some embodiments, the turbine section of the engine has a first-stage vane ring positioned in relation to a turbine bearing housing, and a second-stage vane ring positioned in relation to the first-stage vane ring, using lugs and slots controlled in relation to the central bore of the bearing housing. Such a mechanical arrangement where the bearing housing is used as a reference to centralize the turbine vanes rings may be used to reduce the tolerance accumulation that normally prevails when the TSC is used to individually position the vane rings.

By using lugs and slots to reference the first-stage vane relative to the bearing housing, the tolerance between the first-stage vane ring and the outer race of the bearing is negligible. Then, the second stage-vane ring controlling the radial gap between the turbine blade tip and the outer shroud vane diameter may be positioned in relation with the first-stage vane ring to effectively control blade tip clearance. In some applications, this mechanical configuration may be used to reduce tolerance build-up and eliminate the need for grinding the blade tip interface to optimize the radial distance between the vane bore and the blade tips, thereby resulting in cost savings.

It can also be appreciated that the present disclosure provides for a method of centralizing an outer shroud of a second-stage vane ring about a row of turbine blades of a turbine rotor supported by a bearing for rotation about a central axis. The method comprises: concentrically mounting a first-stage vane ring to a bearing housing of the bearing supporting the turbine rotor; and then concentrically mounting the second-stage vane ring to the first-stage vane ring.

According to some aspects, concentrically mounting the first-stage vane ring to the bearing housing comprises engaging a first plurality of lugs with a corresponding first plurality of slots, the first plurality of lugs provided on one of the first-stage vane ring and the bearing housing, the first plurality of slots provided on another one of the first-stage vane ring and the bearing housing.

Still according to some aspects, concentrically mounting the second-stage vane ring to the first-stage vane ring comprises engaging a second plurality of lugs with a corresponding second plurality of slots, the second plurality of lugs provided on one of the first-stage vane ring and the second-stage vane ring, the second plurality of slots provided on another one of the first-stage vane ring and the second-stage vane ring housing.

Still according to further aspects, engaging the first plurality of lugs with the first plurality of slots comprises angularly aligning the first plurality of lugs in registry with the first plurality of slots and axially inserting the first plurality of lugs into the first plurality of slots.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term “connected” or “coupled to” may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

As used herein, the terms “comprises”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to “various embodiments,” “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article “a” as used herein with reference to a particular element is intended to encompass “one or more” such elements, and similarly the use of the definite article “the” in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology.

The invention claimed is:

1. A turbine assembly for an aircraft engine, comprising:

a bearing housing having a central axis;

a first-stage vane ring positioned in concentric relation with the bearing housing via a first circumferential array of lugs and slots between the bearing housing and the first-stage vane ring; and a second-stage vane ring positioned in concentric relation to the first-stage vane ring via a second circumferential array of lugs and slots between the first-stage vane ring and the second-stage vane ring.

2. The turbine assembly of claim 1, wherein the first circumferential array of lugs and slots comprises a first plurality of slots circumferentially distributed in an annular flange at a rear end of the bearing housing, and a corresponding first plurality of lugs circumferentially distributed along an inner diameter of the first-stage vane ring.

3. The turbine assembly of claim 1, wherein the second circumferential array of lugs and slots comprises a second plurality of slots circumferentially distributed in an outer flange projecting radially outwardly from the first-stage vane ring, and a corresponding second plurality of lugs circumferentially distributed at a front end outer diameter of the second-stage vane ring.

4. The turbine assembly of claim 2, wherein the annular flange is concentric to a bearing bore interface of the bearing housing and extends radially outwardly from an outer diameter surface of the bearing housing.

5. The turbine assembly of claim 4, wherein the first plurality of slots and the corresponding first plurality of lugs are axially engageable and have a radial orientation.

6. The turbine assembly of claim 5, wherein a plurality of holes is defined in the annular flange of the bearing housing for receiving a corresponding plurality of fasteners, the plurality of holes circumferentially interspersed between the first plurality of slots.

7. The turbine assembly of claim 3, wherein the second plurality of slots have a radial orientation, and wherein the corresponding second plurality of lugs projects axially forwardly from the front end outer diameter of the second-stage vane ring.

8. The turbine assembly of claim 7, wherein the second plurality of lugs are axially engageable with the second plurality of slots.

9. The turbine assembly of claim 3, wherein the second-stage vane ring has an outer shroud having an inner surface surrounding a row of turbine blades of a turbine rotor supported by a bearing housed in the bearing housing, and wherein the inner surface of the outer shroud is concentric to the front end outer diameter of the second-stage vane ring along which the second plurality of lugs are circumferentially distributed.

10. The turbine assembly of claim 1, wherein the first circumferential array of lugs and slots comprises a first plurality of lugs projecting radially inwardly from an inner diameter of the first-stage vane ring, and wherein the second circumferential array of lugs and slots comprises a second plurality of slots defined in an outer annular flange projecting radially outwardly from an outer diameter surface of the first-stage vane ring, the first plurality of lugs and the second plurality of slots being circumferentially distributed on concentric circles.

11. An aircraft engine comprising:

a turbine including a first-stage vane ring, a turbine rotor and a second-stage vane ring disposed in series along a central axis, the turbine rotor having a row of turbine blades surrounded by an inner surface of an outer shroud of the second-stage vane ring, the turbine blades having tips spaced from the inner surface of the outer shroud by a tip clearance gap; and a bearing supporting the turbine rotor for rotation about the central axis;

wherein a first circumferential array of lugs and slots centralizes the first-stage vane ring on a bearing housing of the bearing, and wherein a second circumferential array of lugs and slots centralizes the second-stage vane ring on the first-stage vane ring.

12. The aircraft engine of claim 11, wherein the first circumferential array of lugs and slots includes a first plurality of radial slots circumferentially distributed in an outer flange provided at a rear end of the bearing housing, and a first plurality of radial lugs projecting radially inwardly from an inner diameter surface of the first-stage vane ring, and wherein the second circumferential array of lugs and slots includes a second plurality of radial slots circumferentially distributed in an outer flange projecting outwardly from a radially outer surface of the first-stage vane ring, and a second plurality of lugs circumferentially distributed at a front end of the outer shroud of the second-stage vane ring.

13. The aircraft engine defined in claim 12, wherein the first plurality of radial lugs and the second plurality of radial slots on the first-stage vane ring are distributed on concentric circles.

14. The aircraft engine defined in claim 12, wherein the second plurality of lugs are distributed on a circle concentric to the inner surface of the outer shroud.

15. The aircraft engine defined in claim 12, wherein the first plurality of radial lugs of the first-stage vane ring are axially clamped between a back cover and the bearing housing via fasteners engaged in holes circumferentially interspersed between the first plurality of radial slots in the outer flange of the bearing housing.

* * * * *